(12) United States Patent
Kienitz

(10) Patent No.: US 7,093,974 B2
(45) Date of Patent: Aug. 22, 2006

(54) RADIOMETER WITH DIGITAL IMAGING SYSTEM

(76) Inventor: Ulrich Kienitz, In der Wiesenaue 22, 16352 Basdorf (DE)

( * ) Notice: Subject to any disclaimer, the term of this patent is extended or adjusted under 35 U.S.C. 154(b) by 0 days.

(21) Appl. No.: 10/389,703

(22) Filed: Mar. 13, 2003
(Under 37 CFR 1.47)

(65) Prior Publication Data
US 2004/0264542 A1    Dec. 30, 2004

Related U.S. Application Data

(60) Provisional application No. 60/392,733, filed on Jun. 27, 2002, provisional application No. 60/364,993, filed on Mar. 13, 2002.

(51) Int. Cl.
*G01J 5/00* (2006.01)
(52) U.S. Cl. .................... 374/121; 374/141
(58) Field of Classification Search ........... 374/141, 374/121, 208
See application file for complete search history.

(56) References Cited

U.S. PATENT DOCUMENTS

| | | | | |
|---|---|---|---|---|
| 4,343,182 A * | 8/1982 | Pompei | ................ | 374/31 |
| 5,727,880 A * | 3/1998 | Hollander et al. | .......... | 374/121 |
| 6,148,149 A * | 11/2000 | Kagle | ................ | 358/909.1 |
| 6,532,039 B1 * | 3/2003 | Anderson | ................ | 348/231.3 |
| 2001/0030773 A1 * | 10/2001 | Matsuura et al. | .......... | 358/471 |
| 2003/0164978 A1 * | 9/2003 | Song | ................ | 358/1.18 |
| 2004/0190586 A1 * | 9/2004 | Lee et al. | ................ | 374/5 |

* cited by examiner

*Primary Examiner*—Diego Gutierrez
*Assistant Examiner*—Mirellys Jagan
(74) *Attorney, Agent, or Firm*—Charles E. Krueger

(57) ABSTRACT

A radiometer includes an integrally mounted digital camera aligned to image the energy zone of the radiometer. When digital photographs are taken they are time stamped and stored in memory. The images may be viewed on a viewer integrated into the radiometer digital camera system or downloaded to a computer for formatting or viewing.

2 Claims, 5 Drawing Sheets

RADIOMETER WITH DIGITAL IMAGING SYSTEM

BACKGROUND OF THE INVENTION

This application claims priority from provisional Patent Application No. 60/364,993 filed Mar. 13, 2002 entitled radiometer WITH DIGITAL IMAGING SYSTEM and Provisional Patent Application No. 60/392,733 filed Jun. 27, 2002 entitled radiometer WITH DIGITAL IMAGING SYSTEM both of which are hereby incorporated by reference for all purposes.

Radiometers, or infrared thermometers, are used to remotely measure temperatures. The radiometer includes an infrared sensor and infrared optics to form an image of a portion of a remote object, the energy zone, on the sensor. The radiometer calculates the temperature of the imaged energy zone based on the intensity of the infrared radiation focused on the infrared detector.

Various techniques exist to align the radiometer to measure a particular portion, the energy zone, of an object. Some existing techniques include optical alignment systems such as a telescope and laser alignment systems that project a spot into the center of the energy zone and/or a ring on an object that outlines the energy zone.

In an industrial or commercial setting, the results of the measurements might be crucial to safety or product quality and documentation could be required for technical, customer service, marketing or legal purposes.

However, with current systems documentation can be sketchy and a serviceman or technician is required to document the measurements in a separate location.

BRIEF SUMMARY OF THE INVENTION

In one embodiment of the invention, a digital camera and radiometer are integrated into a single housing which aligns the infrared optics of the radiometer and the optics of the digital camera so that the energy zone imaged by the radiometer in included in the field of view of the digital camera.

In another embodiment of the invention, a controller, digital time keeping subsystem, and memory are coupled to the digital camera. When a digital photograph is taken the photograph and the time it was taken are stored in memory.

In another embodiment of the invention, a viewer is integrated into the housing and software is included for displaying stored digital photographs on the viewer.

In another embodiment of the invention, a computer interface is integrated into the housing and software is included for downloading stored images to a computer.

Other features and advantages will be apparent in view of the following detailed description and appended drawings.

DETAILED DESCRIPTION OF THE INVENTION

Figure 1A:
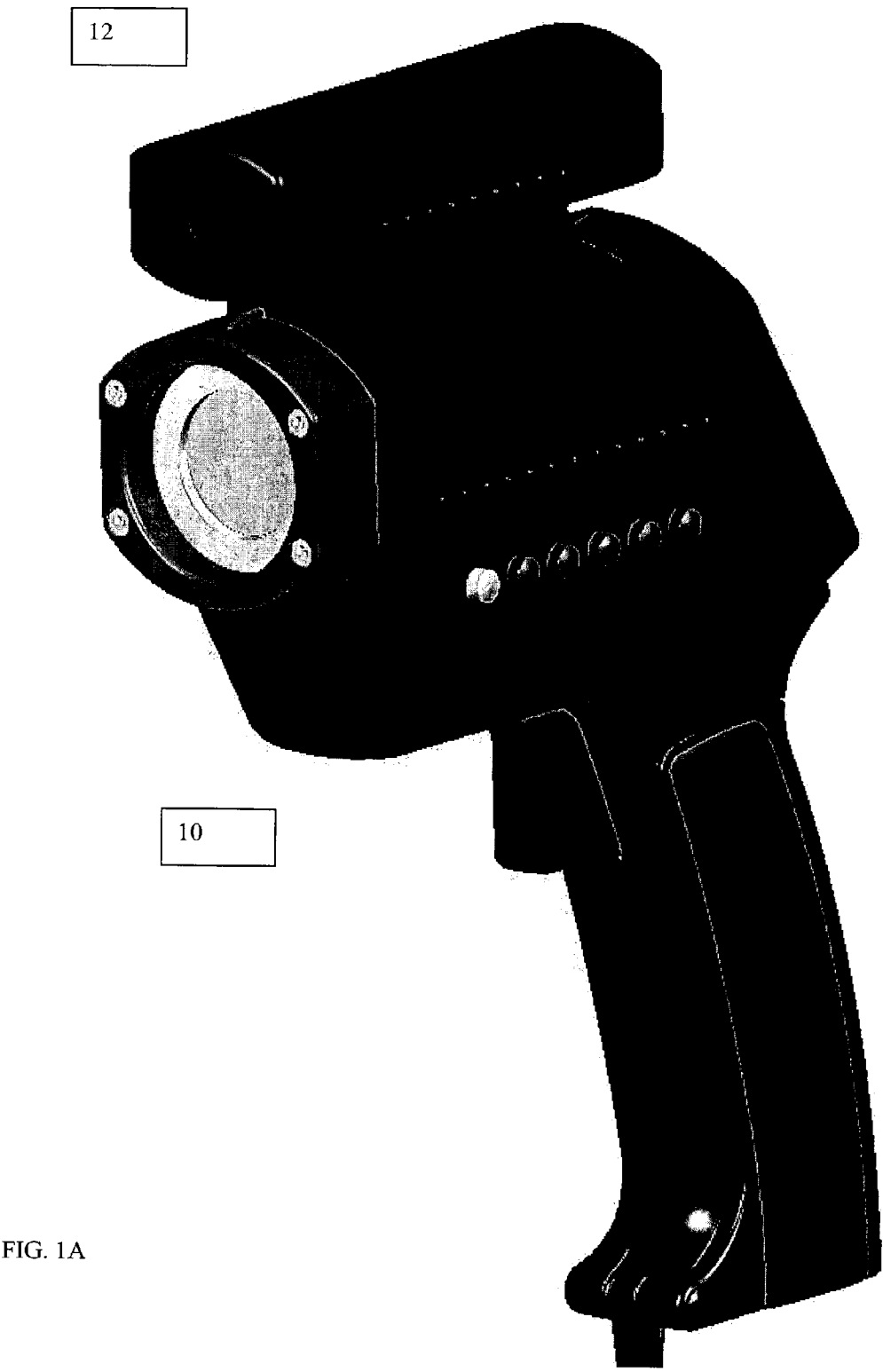
FIGS. 1A and B are perspective views of a radiometer-digital camera system.
Figure 1B:
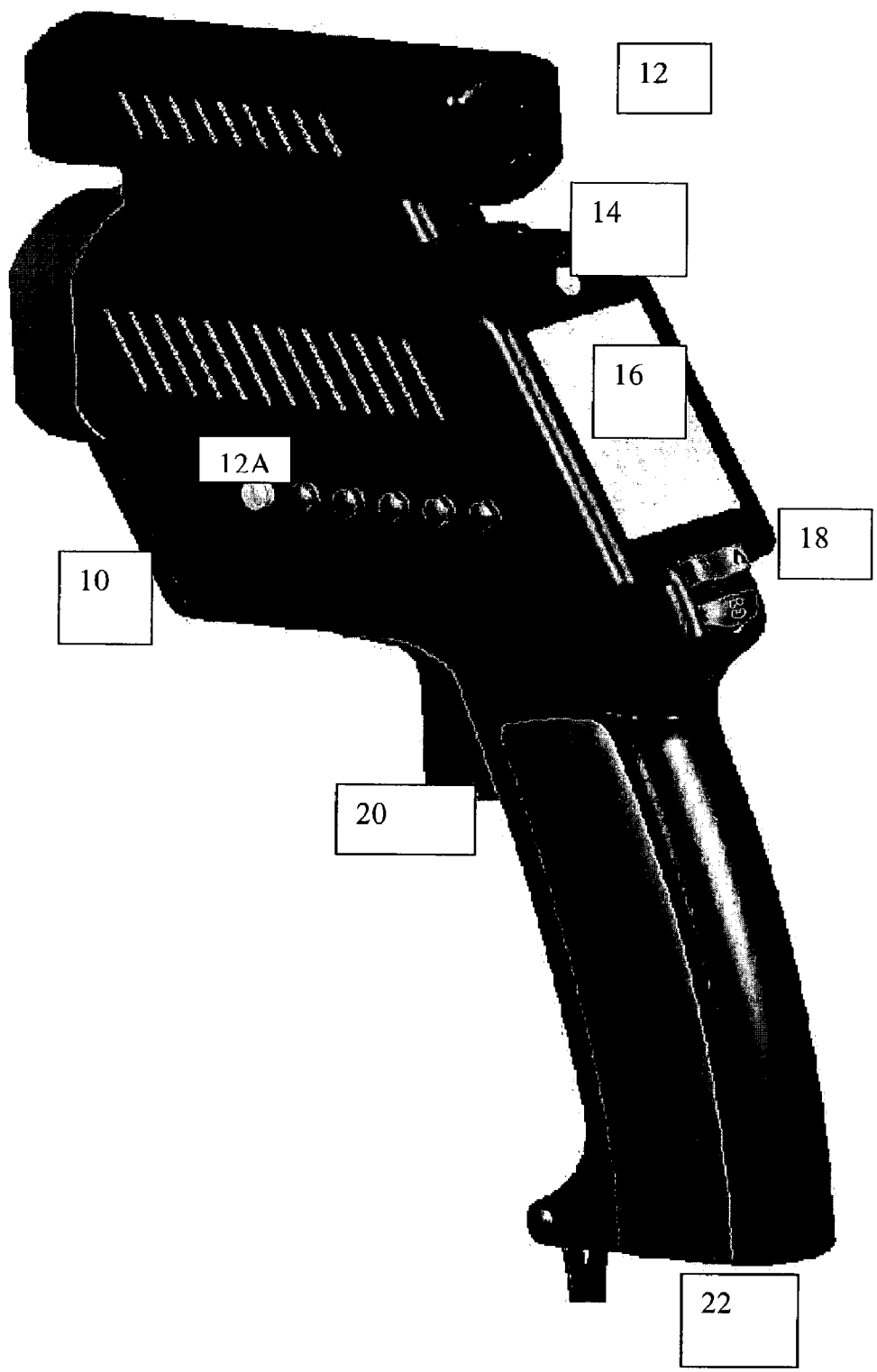

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

In a preferred embodiment of the invention, a digital photography capability is added to a radiometer product. The combined radiometer-digital photography system will allow the user to capture a visual spectrum digital photograph of the target temperature measurement area and the area surrounding it.

Thermal imagers provide a different type of output (IR image vs. visible light image). With the combined radiometer-digital photography system, the user will be able to see the area measured by the radiometer if the radiometer includes a laser-sighting system because the spots generated by the laser sighting system will be visible in the digital photograph.

The user will have the potential to record and store ~100 photographs within the combined radiometer-digital photography system thermometer, to be associated with the maximum 100-router positions available in the radiometer. The date/time stamp of the reading will be also included in the photograph, added by the radiometer software, and will provide an additional dimension of credibility to the photographic image.

One of the principle benefit to users of the digital photography feature is to insure the present quality of temperature inspections and to have a convincing, electronic documentation of the area measured and its temperature at a particular date and time. The photograph will give industrial users confidence that a temperature measurement was made of the correct area. Repair service and parts providers, either employed by equipment owners or contractors, will have solid documentation of the temperature condition of an object in "before" and "after" repair states. This documentation can be used for technical, customer service, marketing, and legal purposes. Because the photographs will be in digital form, they will have the potential advantages of being easily incorporated in other documents, archived, and emailed. Markets where the invention can be advantageously employed include preventive maintenance, (especially of electrical components where imager reports are well established), electrical utilities, non-hazardous petrochemical locations, and inspection services regulated by documentation requirements.

An embodiment is depicted in FIGS. 1A and B, where the form factor of the combined radiometer-digital photography system will be that of an existing radiometer 10 having a pistol form factor with the addition of a digital camera 12 mounted above. The digital camera 12 extends the pistol form factor metaphor by appearing to be an optical sighting scope. The digital camera does not need a viewfinder because the laser sighting system generates laser spots outlining the energy zone to ensure that a photograph of the energy zone is recorded. The radiometer-digital camera system includes a control button interface 12 including a data button 12a, an LED 14, a viewing screen 16 which is described in more detail below, an up down button 18, a trigger 20, and a USB connection 22. Images and temperature information can be downloaded to a PC or other digital devices via a USB connection 22.

Figure 2:
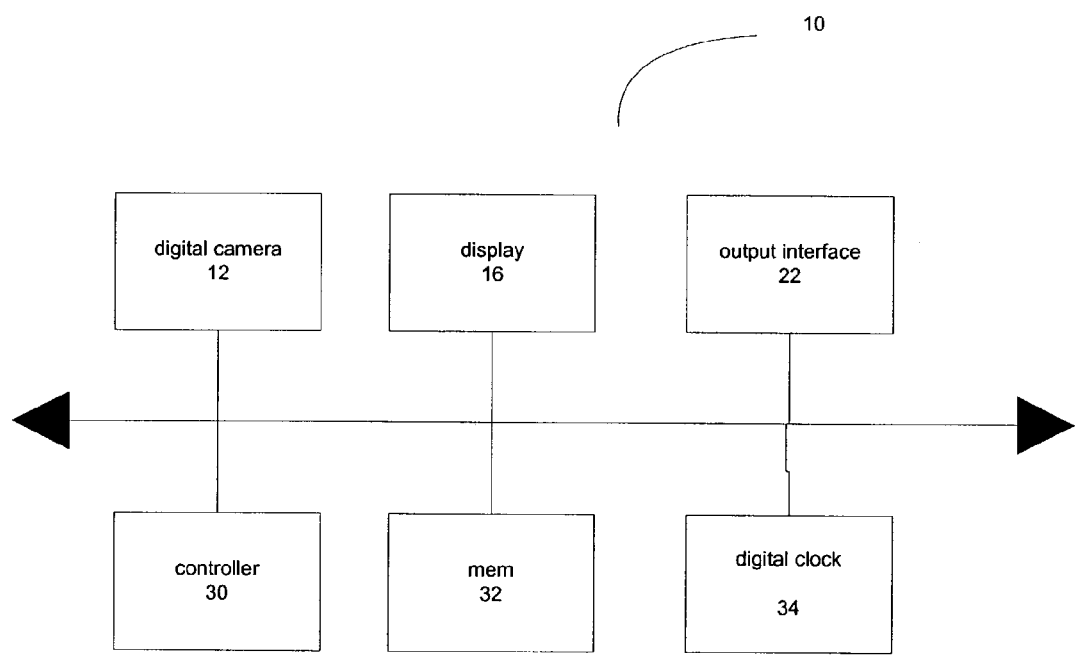
FIG. 2 is a block diagram depicting components of an embodiment of the invention.

FIG. 2 is a high-level block diagram of a preferred embodiment. The digital camera 12, a controller 30, a memory subsystem 32 which hold program code modules for storing, displaying, and downloading digital photographs, a digital clock subsystem 34, and the output interface 22 share data over a data bus. As is known in the art, FIG. 2 is highly abstracted and the actual connections between the various elements can be implemented in numerous ways. Additionally, control lines or a control bus (not shown) couple the controller to the various elements.

User Interface of a Preferred Embodiment

Display and LED: The unit display will use the existing radiometer display and LED, adding functionality. Photographs will be recorded simultaneously with temperature and date/time data as the user works his way through the logger positions routing scheme.

Operational Overview

The basic concept of the combined radiometer-digital photography system is that a photograph will be taken in the same instant as a temperature reading with date/time stored in one of the 100 log positions in the radiometer's memory. Temperature and image recording will occur as the trigger is released. A camera viewfinder is not necessary since the laser sighting system will show the temperature reading and the center of the photograph.

The camera memory must be able to hold at least as many photographs as the radiometer has log positions (one hundred) under common operating conditions. If there is insufficient non-volatile memory available in the radiometer, then deleting printer strings is the preferred first choice for freeing additional memory. The system gives the user easily understood "signals" to indicate if there is a problem with the photograph due to low light and out of memory (described below).

Figure 3:
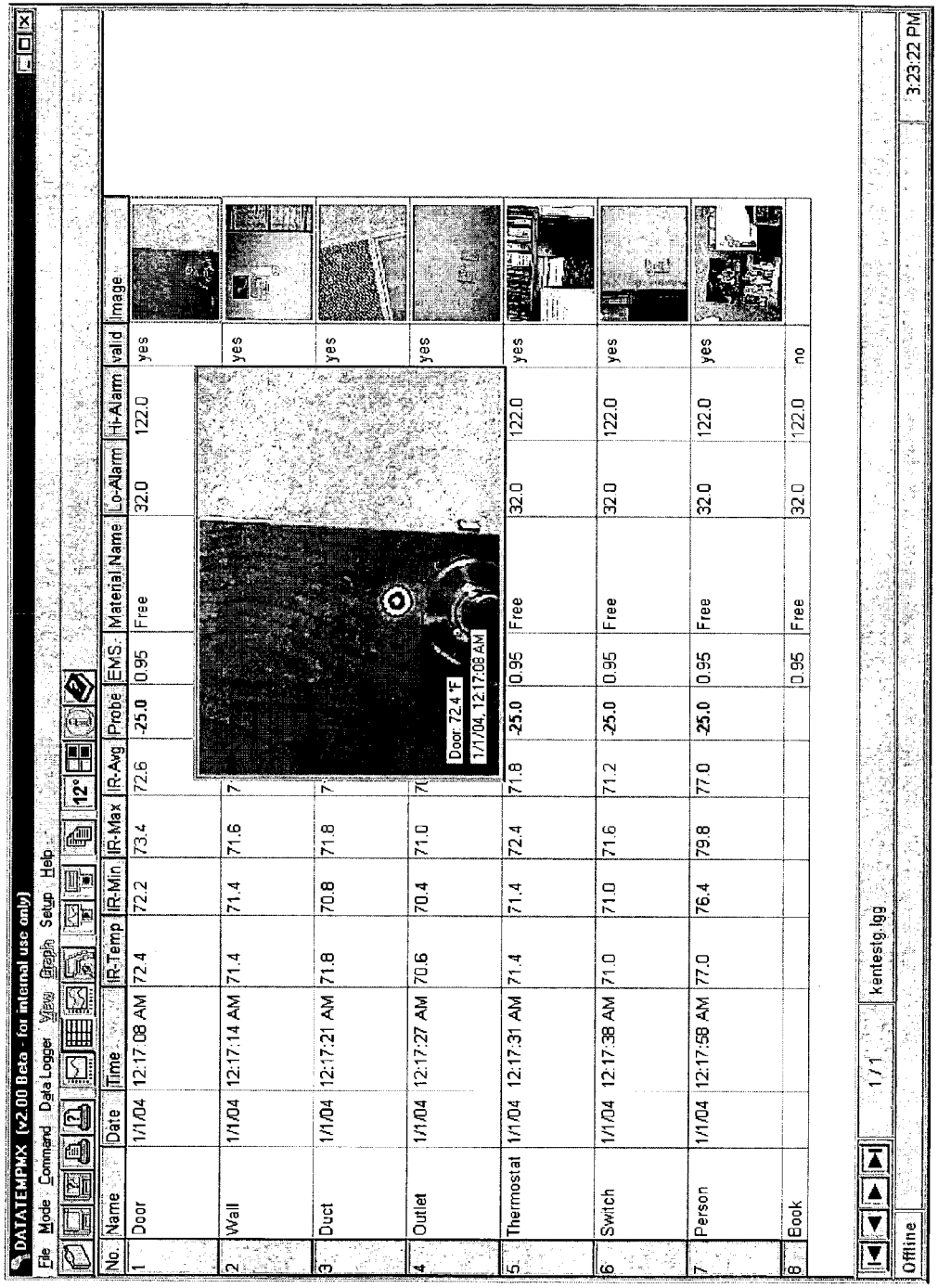
FIGS. 3 and 4 are screen shots depicting formats for organizing and displaying digital photographs and information about the photographs on a digital computer screen.

An important element of this embodiment is integration with the radiometer software. When the radiometer is connected via a USB port to a computer and the LOG mode is invoked, the photographic information is downloaded from radiometer to the computer along with the logger information. This data can be saved as a file. The tabular format of log table information is depicted in FIG. 3 and includes thumbnail pictures of the digital photographs that are displayed along with the position name, temperature, date/time, emissivity, and alarm information. It is possible to see the full-size photograph by double-clicking on the thumbnail. Individual creation of digital (.jpg) files of each photograph with the date/time and position name superimposed must be easily accomplished.

Figure 4:
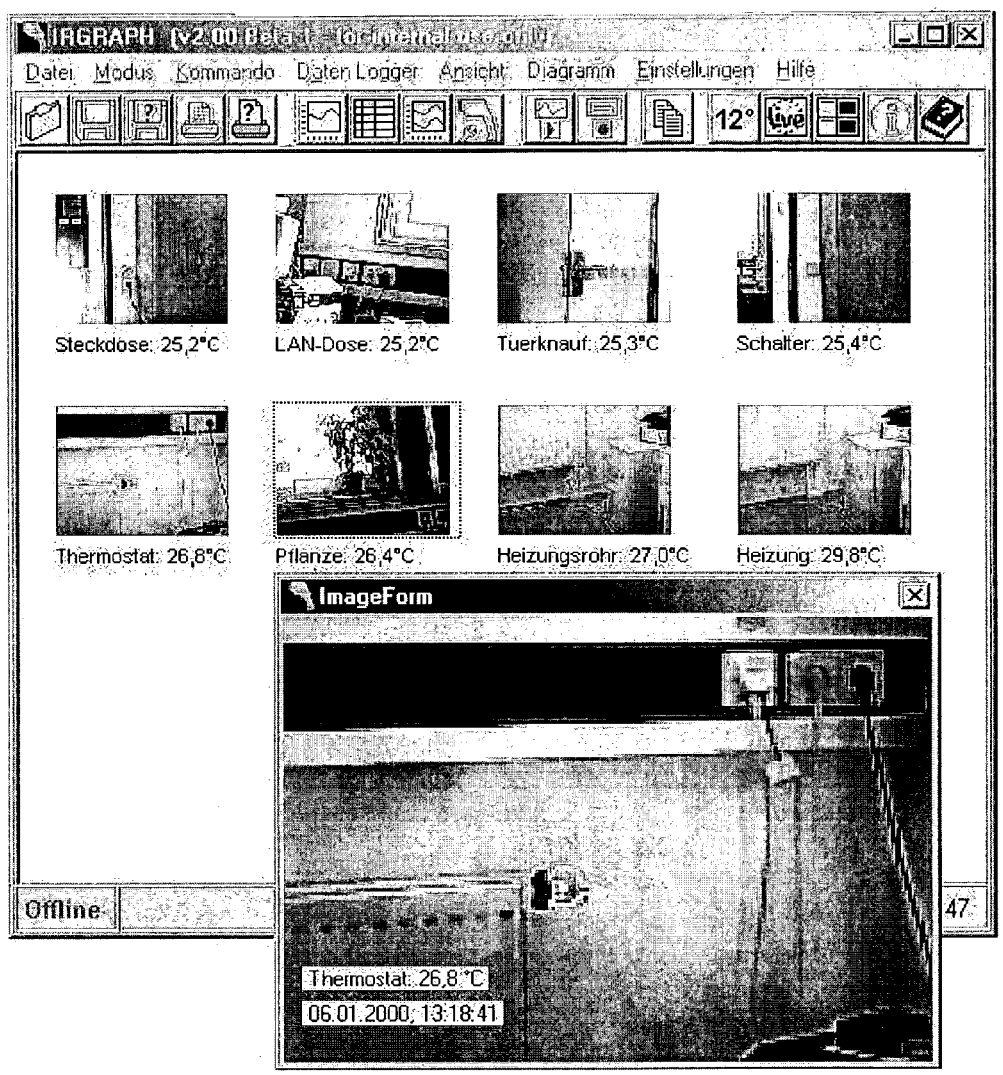

Another format is depicted in FIG. 4 where the photos only are displayed as thumbnails with each photo labeled with an identifier and the measured temperature.

In another embodiment, the combined radiometer-digital photography system will include a digital-camera style viewer 16, for example in the form of an LCD display, to allow the user to view photographs stored in memory directly on the radiometer. The viewer will be able to scroll through all the pictures stored in memory and also view the current image being acquired. Thus, the user will be able to better align the camera based on the immediate view and also view all the previous time-stamped images directly when using the combined radiometer-digital photography system.

The camera will operate in continuous video display-in-a-window mode when the combined radiometer-digital photography system is connected to a PC in the radiometer's temperature monitoring mode. Photographs will be automatically stored with the monitored temperature when a user-specified alarm condition is satisfied.

An integral flash unit for low light conditions can also be included.

Inspection Routing with Simultaneous Photographs

Features of a specific embodiment will now be described. At any time, the user can see how many photographic "positions" have been used out of the total potential by pressing the data button until a display of the form "images: x/106" is shown and for an instant after taking a measurement (see below).

The user will press the Data button once to enter Recall mode. Recall mode will allow the user to see previously stored temperature values by pushing the up and down arrow buttons 18 to move between positions. The positions may have been named with the radiometer software or could have generic names, i.e. "Loc 1". The location name and temperature value are displayed at the bottom of the display with the "RCL" icon visible.

The user can either switch to Log mode by pushing the Data button 12a once more or to normal mode by pushing the Data button 12a twice. Once in Log mode, the combined radiometer-digital photography system is ready to simultaneously record temperature information with photographs (if the photography ability has not been switched off via the radiometer software). The ability to take photos can be switched on/off for each used logger position during configuration of the device logger in the radiometer software (in Logger mode Setup). Independent of the Logger setup, the camera function can be switched off using the button interface of the combined radiometer-digital photography system to give a user in "low battery" situation the chance to finish the routing run. A photograph will be attempted upon trigger release. Given sufficient light, the unit will signal successful storage of an image via two short buzzer "beeps" and flashing the LED in green mode and display the message "images:x/106" for 2 seconds in the logger position location on the display to show the amount of photos consumed.

If a photograph is not successfully recorded for either low light or insufficient camera memory, there will a long beep and the LED will flash in red mode. If the problem in recording a photo is low light, the display will show "Low Light" (same error message for camera movement problems). If the camera is out of memory, it will display the message "Out of Memory" for 2 seconds. Then, The system will display "images: x/106" (shorthand for the amount of potential photographs remaining of the maximum number of photographs) for 2 seconds.

An implementation that cannot reuse camera memory except when the memory is totally cleared is possible. This means that that more than one photo position in memory is consumed by one radiometer temperature logger position, creating the possibility of running out of photo memory before there is one photo for each of the combined radiometer-digital photography system's one hundred temperature logger positions. This behavior is the reason that the user must be aware of the used and remaining photo positions in the camera's memory.

If the camera successfully records an image, the routing position will advance to the next position and remain in log mode. If no photo was recorded, the position will not advance, giving the user another opportunity to record an image and temperature. The system will remain in Log mode until the Data button is pushed again and it returns to normal mode.

Download of Photographs and Temperature Information

The user connects the combined radiometer-digital photography system to a computer using a standard USB cable. USB is the protocol because of its ubiquity on laptops and because it is fast enough to download one hundred quarter VGA sized images quickly. The user will then invoke the version of the radiometer software that has been modified to support the combined radiometer-digital photography system. The user will be able to set a default mode in the Setup menu in the software to automatically download the images associated with each logger position or to query at each download. The user will also be able to set clearing of the combined radiometer-digital photography system's camera and temperature as a default option to perform this task manually. Thumbnail images will display in a new column of the radiometer logger mode matrix as depicted in FIG. 3. The user will be able to zoom the image to 100% by clicking on the thumbnail. This action opens a standard Windows window with standard controls, e.g. maximize, minimize, close, title bar. By right clicking on the full size photo, the user will be able to save the image to another file in .jpg format.

The user will be able to create a report page in .doc (MS Word) format of the information pertaining to a row (position) in the radiometer software. The user will be able to choose among report page templates in the Setup menu. At least an electrical maintenance report template and a generic reporting template will be supplied with the radiometer software. These templates will accommodate user-customized headers and placement of the logger position data. The basic concept is that a program (can be Word macro or VBA) will "place" the temperature or photographic data in forms defined by the user or included with the software. Each field in the radiometer logger data table is exportable to the report templates. For instance, the temperature information in the .lgg file for a position is exportable to &temp field in the template; the emissivity field is placed in &emissivity, the photograph to &photo, etc. Revisions of this document will have drawings of the report format template(s).

Software Installation

Standard Window installer software automates the installation of radiometer software produce a fully compliant installation (with standard Windows practices). Standard installation establishes program groups and icons on the Program menu. Uninstall functionality is provided.

Temperature Monitoring Mode

The system will add to the capabilities of radiometer's "Temperature" mode, the mode that measures and records temperature in real time. A window is added to this screen that displays real time video so that the user will be able to see the object being measured concurrently with the temperature display. A menu item is added to allow the user to specify software alarm, high, low, and delta T. The user can specify a minimum interval between photographs. If an alarm condition is satisfied when radiometer is recording data, a photograph with a date and time stamp will be recorded. This ability to allows users the possibility of seeing a physical change in the object under measurement.

Summary of Features Included in Various Embodiments

1. Download of all data, including images, from the combined radiometer-digital photography system to PC in less than 15 seconds
2. Images at least ¼ VGA size (160×120) and 16 pixels deep, Switchable to full VGA and one fourth the number of photos via radiometer software.
3. Camera field of view for normal focus 6 mm focal length, close focus also 6 mm. This is fairly wide angle to show more context of the object measured, gain more light and have larger depth of field.
4. Photos retained in the combined radiometer-digital photography system for minimum 60 days with new batteries and no use.
5. "Generous" low light conditions, similar to light capture of f1.8 lenses for 35 mm camera. 10 lux.
6. PC must be available for program startup and other functions within 5 seconds of USB connection of the combined radiometer-digital photography system.
7. The .lgg file must be printable with the thumbnails.
8. Date/Time stamp and location name should be included in the image
9. Double-clicking on the thumbnail of the image in radiometer shows it at full size in a standard Windows window including Close, Minimize, and Maximize. Right click in the image pops up a menu to print out a full image from radiometer and also allows specification of the image numbers (range) in the print dialog. The menu also allows export to a .jpg file.
10. A comment field of 32 characters should be displayed in the radiometer logger table to be interactively edited. This is for user comments like "motor recently lubricated" (which are not found in the MX unit but only in the *.lgg file)
11. Must be a "No camera" mode setting with the Mode button to save battery power
12. Logger positions will show an indication on the MX display of a photo associated, for example, an asterisk (*).
13. Radiometer software will allow the user to draw, optionally, a simulated sighting circle in the image. This option would be useful for photos where the laser circle is not easily visible and the distance is far enough to avoid the most severe parallax effects of the offset mounting of the camera. The drawn circle must be clearly distinguishable from a photographed laser alignment system generated circle.

The invention has now been described with reference to the preferred embodiments. Alternatives and substitutions will now be apparent to persons of skill in the art. For example, the utility of the invention is not restricted to any particular radiometer form factor. Further, the particular details of formatting report documents is not critical to practicing the invention. Additionally, the particular control interface described is not critical to practicing the invention and other control interfaces, such as voice activation, can be utilized as is known in the art. Accordingly, it is not intended to limit the invention except as provided by the appended claims.

What is claimed is:

1. A temperature measuring system comprising:
   a radiometer that remotely measures temperature based on emitted infrared radiation with the radiometer including an infrared sensor, infrared optics for focusing infrared radiation emitted by an energy zone on the infrared sensor, and a laser sighting system for outlining an energy zone;

a digital camera, having no view finder, for creating a digital image of an object located in a field of view of the digital camera;

a housing for enclosing and aligning the digital camera and radiometer so that the field of view of the digital camera includes the energy zone imaged on the infrared sensor;

a digital time generating subsystem;

a control interface;

a user's computer coupled to the temperature measuring system;

a controller and memory located within the housing, with the memory storing logging program code which, when executed by the controller in response to the control interface, causes logging data, including temperature measurement information characterizing an energy zone being imaged at a first measurement time onto the IR sensor and including time of measurement data, to be stored in memory, with the memory further storing image storing program code which, when executed by the controller in response to the control interface, causes a corresponding digital photograph to be taken at about the first measurement time to be stored in memory and associates the digital photograph with associated logging data acquired at the first measurement time, and with the memory storing downloading code for outputting associated logging data with a corresponding digital photograph of an object including the energy zone characterized by the logging data so that a digital photograph of an object along with the logging data associated with the digital picture can be displayed on the user's computer, and with the user's computer monitoring temperature data from the energy zone and causing a digital photograph to be taken of an object under measurement when an alarm condition is satisfied to allow the user the possibility of seeing a physical change in the object under measurement when the alarm condition is satisfied.

2. The system of claim 1 where the housing is formed of a first part holding the radiometer, and control interface and second part holding the digital camera, the first and second parts attached to form a single housing.

* * * * *